Figure 1:
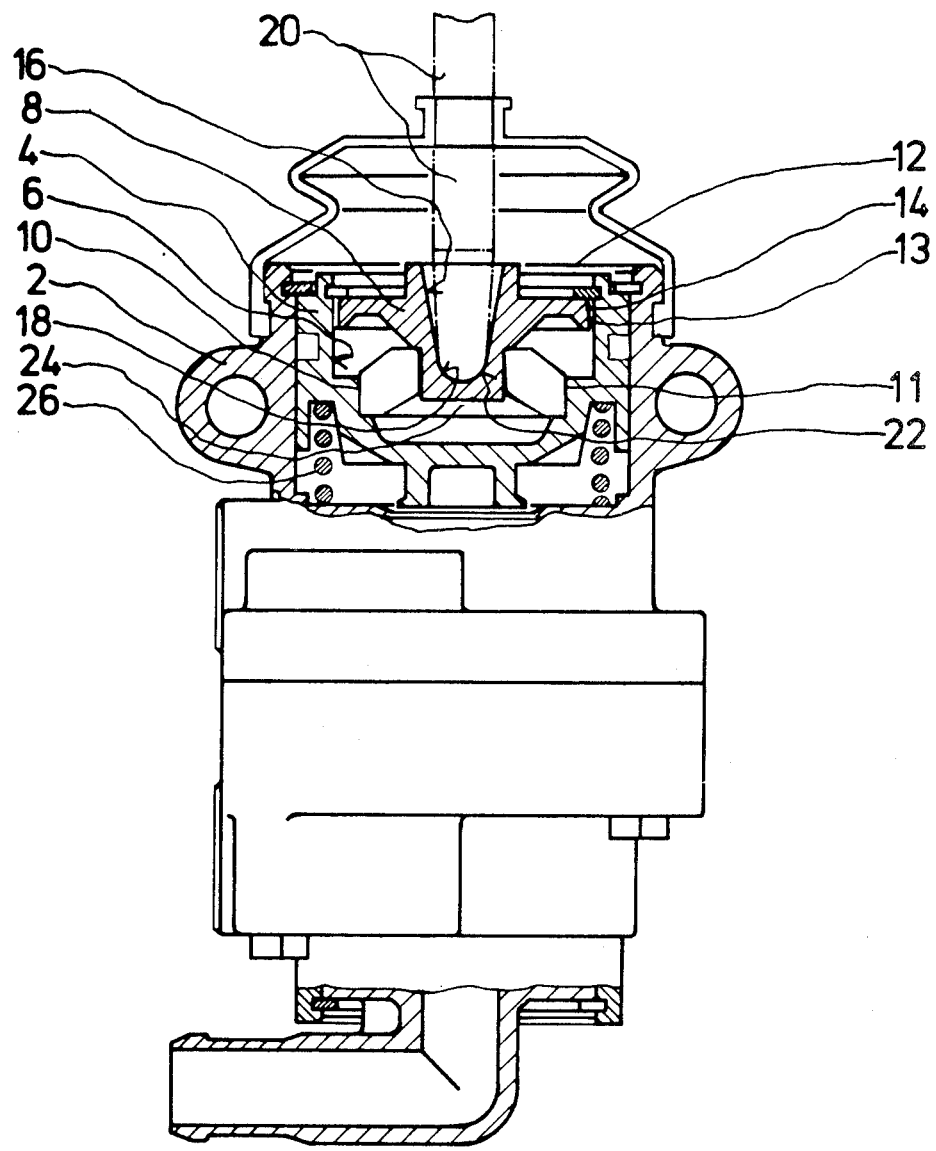

United States Patent [19]

Reinecke

[11] 4,193,641

[45] Mar. 18, 1980

[54] BRAKE VALVE

[75] Inventor: Erich Reinecke, Beinhorn, Fed. Rep. of Germany

[73] Assignee: WABCO Westinghouse GmbH, Hanover, Fed. Rep. of Germany

[21] Appl. No.: 924,279

[22] Filed: Jul. 10, 1978

[51] Int. Cl.² .............................................. B60T 17/00
[52] U.S. Cl. ........................................ 303/50; 251/321
[58] Field of Search .................... 303/50, 54; 251/213, 251/228, 321–323

[56] References Cited

U.S. PATENT DOCUMENTS 2,259,809   10/1941   Freeman ................................. 303/54

*Primary Examiner*—Duane A. Reger
*Attorney, Agent, or Firm*—R. S. Visk; R. W. McIntire, Jr.

[57] ABSTRACT

A brake valve device including a valve-actuating piston for contacting and effecting operation of a valve member, the valve-actuating piston being provided with a stepped bore in which a spring-biased spring seat member is engaged by and axially slidably movable by a push rod for actuating the valve device. The peripheral surface of a guide flange formed on the spring seat member for stabilizing axial movement thereof in the stepped bore, is spherically-shaped for permitting such axial movement without hang-up or jamming in the bore.

3 Claims, 2 Drawing Figures

BRAKE VALVE

The invention concerns a brake valve actuated by a lever or push rod, with a pretensioned spring resting on a piston and a sliding spring rest.

Lever-actuated motor vehicle brake valves are known, in which a contact piece of the lever acts upon another contact piece arranged in a bellows; the latter pressure piece is guided in a carrier plate and acts upon a spring rest of a spring in the form of a rubber spring, which in turn acts upon a piston actuating the valve.

This known brake valve has various disadvantages. First of all, the additional friction between the contact piece and the carrier plate is a disadvantage. The rubber spring used here always has nonhomogeneities. Since the rubber spring is actuated by the contact piece rather rigidly, the nonhomogeneity entails the risk that tilting moments will be exerted on the piston, so that there is a risk of elevated friction and wear as well as poorer gradation. In addition, the known valve has a relatively great length because of the additional contact piece and the additional carrier plate, thereby resulting in higher construction costs.

In addition, push rod-actuated motor vehicle brake valves are known in which a push rod is arranged in a recess of a contact piece arranged in a bellows, said contact piece being guided in a carrier plate. As in a lever-actuated brake valve, the contact piece acts via a spring rest upon a spring in the form of a rubber spring which in turn acts upon a piston to actuate the valve.

This known push rod-actuated brake valve has essentially the same disadvantages as the above-described lever-actuated brake valve. The great length of this brake valve is seen as a particular disadvantage because the valve usually has to be housed outside the cab and must be remote controlled via levers and rods.

Therefore, the objective of the present invention is to improve a brake valve that can be push-rod actuated so that the above listed disadvantages of the known brake valves no longer occur.

This objective is met in a brake valve of the type mentioned at the outset by giving the spring rest a central recess in which a push rod rests that can be actuated.

The central recess permits the use only of a push rod that can be actuated directly, e.g., via the usual brake-actuating element that is present, without additional rods and guides, because the recess itself provides a reliable bearing. This results in a considerably shorter design length so that the brake valve of the invention can be housed in the cab and, since additional actuating levers or actuating rods can be dispensed with, the installation costs can be substantially reduced. A low number of actuating elements and joints and the fact that special bearing and guide components are dispensed reduce the friction and hysteris and improve the gradability of the valve.

In accordance with another advantageous design of the invention, the push rod is connected in a pivoting manner to an essentially known brake-actuating element, e.g., brake pedal and rests directly in the recess. This results in a total of only two friction sites and permits a relatively short design length.

In accordance with another advantageous variant of the invention, the recess in the spring rest is a funnel-shaped hole ending in a spherical shape. As a result, the friction of the push rod in the recess is reduced even further and the guiding improved.

In accordance with another variant of the invention, by using a counter-bore, whose closed end is preferably spherical, it is quite possible to design the push rod end in a corresponding complementary manner to achieve a further reduction in friction and improvement of the guiding.

In another advantageous design of the invention, the point, line or surface of application of the push rod lies in the recess of the spring seat in the direction of motion of the push rod as seen behind the spring support surface of the spring seat. With this design, the spring seat cannot tilt because the application of force occurs behind the spring support point, so that a tensile and hence, self-stabilizing motion is transmitted.

Another improvement of the self stabilization can be achieved in accordance with another design of the invention by the fact that the contact point, line or surface of the push rod in the recess lies in the middle third of the external piston diameter in the installed state.

Simple installation of the spring seat for the tension loading of the spring can be achieved in another variant of the invention by arranging the spring seat in a hole in the piston with the aid of a guard ring and holding it here in a spring-loaded manner around the circumference.

Good radial guiding of the spring seat can be achieved by guiding the spring seat with circumferential parts in the hole in the piston.

Furthermore, in order to avoid the hazard of an oblique setting of the spring seat and jamming, which could be caused by tolerances and non-homogeneity of the spring, the surfaces of the circumferential parts of the spring seat, which are guided in the hole in the piston, are spherical in design.

Another advantageous design of the invention lies in the fact that the spring seat has an extension pointing in the direction of actuation, and said extension protrudes into the interior of the spring and comes to rest against the piston at the end of the distance travelled by the spring. As a result, the spring seat undergoes very little stress even when overloaded and can be dimensioned relatively small without risk of damage, which would not be the case, if the spring seat came to rest on the outside edge.

The invention shall now be explained in greater detail on the basis of the attached drawing.

The following are shown:

FIG. 1—a brake valve designed in accordance with the invention and

Figure 2:
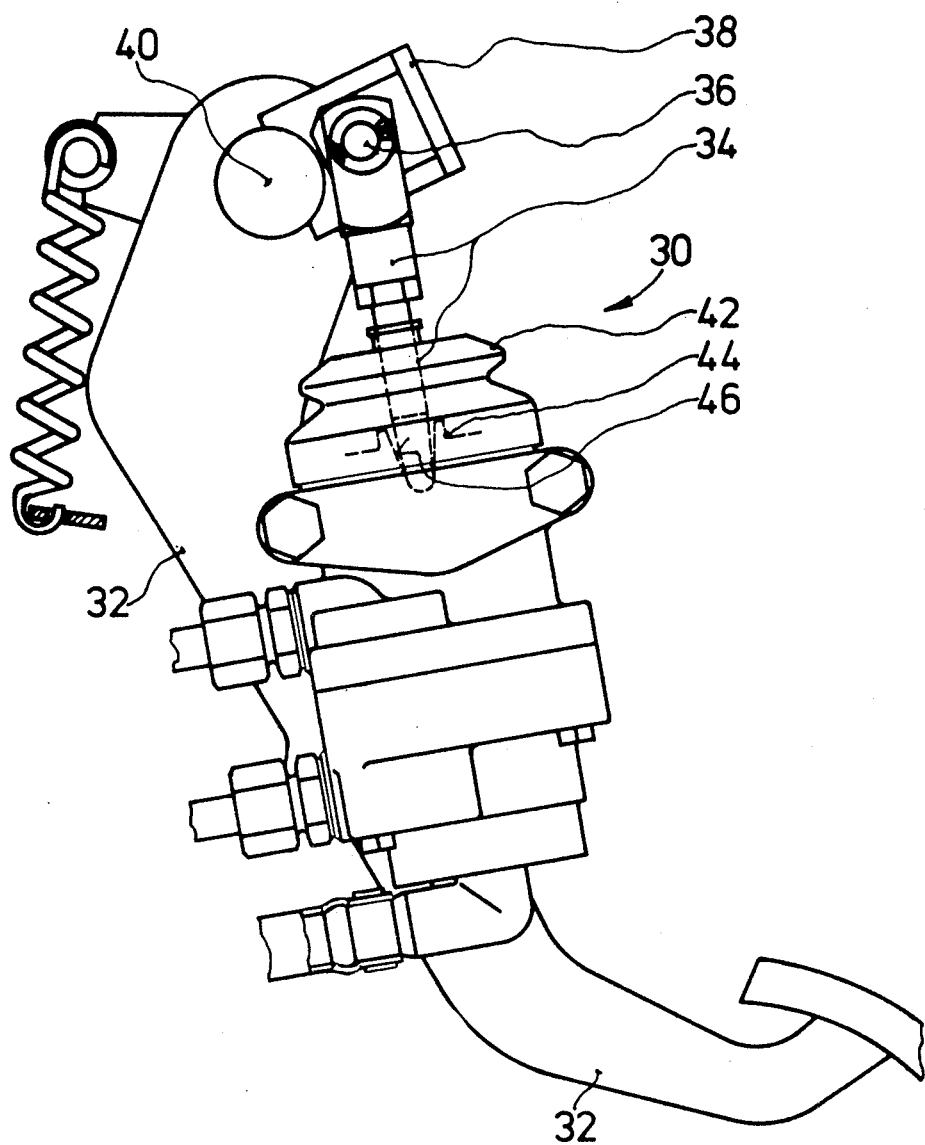

FIG. 2—the brake valve of the invention according to FIG. 1, in the installed condition, so to speak, with brake pedal actuated.

FIG. 1 shows a brake valve designed in accordance with the invention. A valve actuating piston 4 for the actuation of a valve body (not shown) is arranged in a housing 2. The piston 4 has a graduated center hole or stepped bore 6, closed at the lower end, as viewed in the drawing, and open at the opposite or upper end and in which a spring seat 8 is arranged in a larger-diameter portion adjacent said open end, on which a spring 10—shown here in the form of an annular rubber spring—rests on its support surface or shoulder 11. In addition, the spring 10 rests against piston 4, as shown. A guard ring 12 holds the spring seat 8 in a limit position in a tension-loaded manner against spring 10, essentially on the circumference.

The spring seat 8 is guided along the wall of the hole 6 of the piston 4 with a circular guide flange 14 formed at the upper end of said spring seat and provided with outside surfaces 13 designed as crowns or spheres. The spring seat 8 has a central funnel-shaped recess 16, whose bottom seal surface 18 is spherical in design. A push rod 20 is arranged in this recess 16, and its free end surface 22 is designed complementary to the surface 18 and it is guided outward via a superimposed sleeve, so that it achieves three-dimensional mobility.

The point of application of the push rod on the spring seat in the recess 16 is selected such that it lies under the support surface 11 in the drawing, so that a tensile force is transmitted to the spring seat 8 and it executes a self-stabilizing motion, so that an oblique setting and jamming are avoided; this is supported in addition by the lateral guiding of spring seat 8 with the aid of the annular flange 14.

The spring seat 8 is also provided with an extension 24 on the lower side thereof, as viewed in FIG. 1, passing through a concentric opening in the spring 10, with which the spring seat can come to rest against the piston 4 at the end of the spring's stroke.

When a brake pedal (not shown) is actuated, for example, the push rod is moved downward in the drawing and transmits the motion to piston 4 via the spring seat 8 and spring 10, and said piston actuates the valve (not shown) downward against the force of a pretensed spring 26. After the brake pedal is released, the spring 10 again presses the spring seat upward and the piston 4 follows this motion under the influence of spring 26.

The figure shows essentially the construction size of the brake valve 30 designed in accordance with the invention, which is designed here for a two-circuit brake system. Only a push rod 34 is needed as a transmission element to transmit the motion of a brake pedal 32, and it pivots at 36 on the one short lever 38 of the pedal. The brake pedal itself pivots around a pivot point 40. In order to illustrate the position of the construction parts of the invention, the position of the spring seat 44 of the invention with its recess 46 is indicated in dots and dashes under a bellows 42.

I claim:

1. A brake valve device comprising:
   (a) a casing;
   (b) a valve-actuating piston axially spring-biased in one direction in said casing toward a limit position and having a coaxial stepped bore therein having a closed end oppositely disposed to an open end thereof;
   (c) an annular spring seat member coaxially slidably disposed in a larger-diameter portion of said stepped bore adjacent the open end thereof;
   (d) an annular spring member coaxially compressibly disposed within said valve-actuating piston with one end resting against an annular shoulder formed in said bore adjacent the closed end thereof,
   (e) said spring seat member having an axial extension extending from a lower side thereof through a concentric opening in said spring member toward said closed end of said bore and having an annular shoulder against which the other end of said spring member rests to form an annular juncture therewith,
   (f) spring seat member also having formed coaxially therein a funnel-shaped recess with the smaller-diameter end thereof forming a spherically-shaped bottom extending into and formed in said axial extension below said annular juncture;
   (g) an axially movable push rod extending into said funnel-shaped recess with a free end thereof resting against said spherically-shaped bottom thereof for applying actuating force to said spring seat member for effecting axial movement of said actuating piston through said spring member; and
   (h) an annular guide flange formed on the end of said valve seat member opposite said axial extension for guiding movement of the valve seat member in said bore, said guide flange having a spherically-shaped peripheral surface for facilitating movement thereof against the wall of said bore.

2. A brake valve device, as set forth in claim 1, wherein the free end of said push rod resting against the bottom of said funnel-shaped recess is complementarily shaped.

3. A brake valve device, as set forth in claim 2, wherein the point of contact between said free end of said push rod and said bottom of the funnel-shaped recess is axially on the opposite side of said juncture relative to said guide flange.

* * * * *